United States Patent [19]

Horkey

[11] 4,345,685

[45] Aug. 24, 1982

[54] CHAIN DRIVEN CONVEYOR BELTS

[76] Inventor: Edward J. Horkey, 835 W. 22nd St., Suite C, Tempe, Ariz. 85282

[21] Appl. No.: 172,142

[22] Filed: Jul. 25, 1980

[51] Int. Cl.³ .................... B65G 17/06; B65G 17/38
[52] U.S. Cl. .................................................. 198/852
[58] Field of Search .............. 198/852, 831, 733, 834, 198/712

[56] References Cited

U.S. PATENT DOCUMENTS

| | | | |
|---|---|---|---|
| 2,157,283 | 5/1939 | Dyson | 198/831 |
| 3,951,256 | 4/1976 | Gurewitz | 198/831 |
| 4,153,152 | 5/1979 | Lapeyre | 198/831 |
| 4,187,943 | 2/1980 | Horkey | 198/733 |
| 4,282,971 | 11/1981 | Becker | 198/834 |

FOREIGN PATENT DOCUMENTS 883950  7/1949  Fed. Rep. of Germany ...... 198/831

Primary Examiner—Robert B. Reeves
Assistant Examiner—B. Bond
Attorney, Agent, or Firm—Warren F. B. Lindsley

[57] ABSTRACT

A chain driven flexible belt conveyor for carrying solid materials around corners avoiding the use of edge guiding rollers.

12 Claims, 11 Drawing Figures

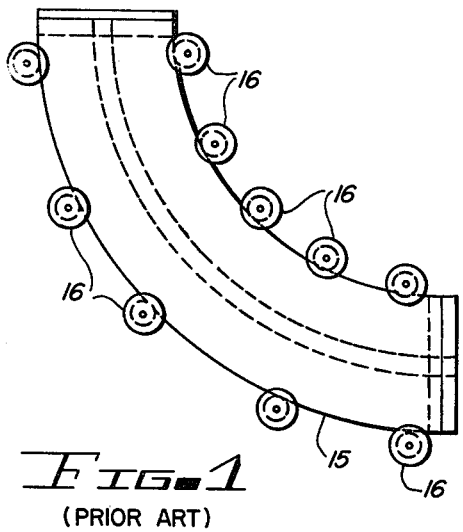
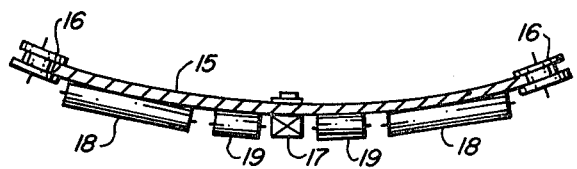
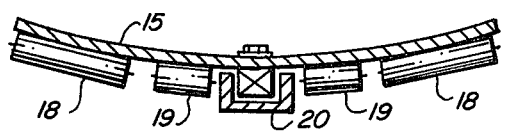
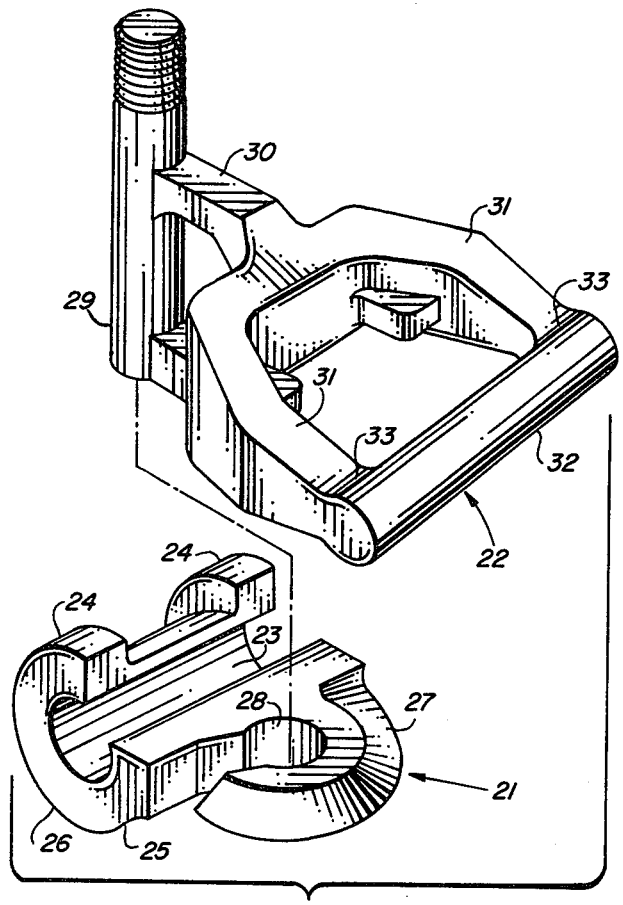
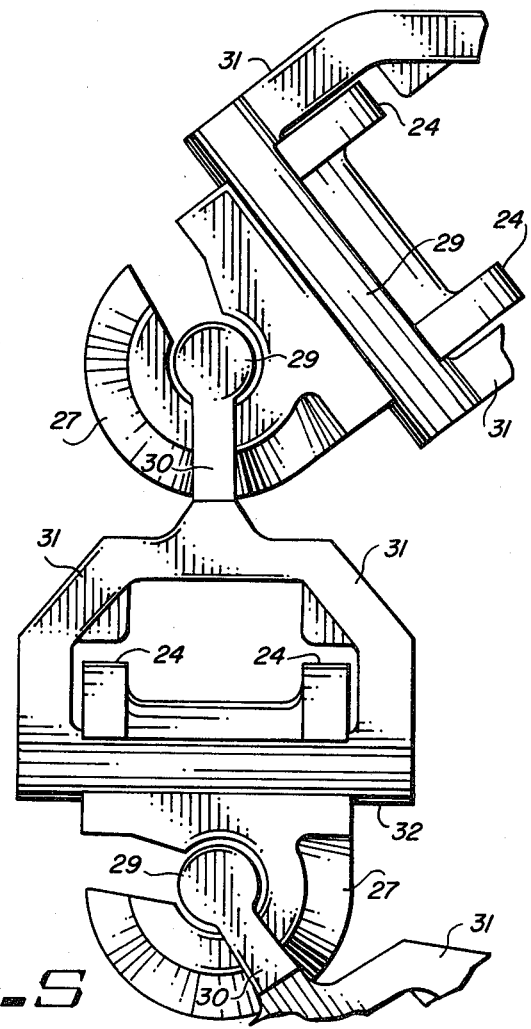

CHAIN DRIVEN CONVEYOR BELTS

BACKGROUND OF THE INVENTION

This invention relates to conveyor belts such as commonly employed in feeding comminuted materials to processing vessels in chemical, metallurgical and other processing industries and more particularly to chain link driven flexible conveyor belts.

Usually it is possible to feed these materials to such equipment by means of screw conveyors, belts, and other conventional solids handling apparatus. However, in certain instances where conveyor belts are used these belts must be guided in an arcuate path. Heretofore, the guiding means for these belts around their arcuate paths have been rollers mounted along the peripherial edges of the belt. Not only has this been unsatisfactory causing buckling of the belt but it also has resulted in undue wear of the belt thereby shortening its useful life.

As evident from U.S. Pat. No. 4,187,943 granted to the applicant of this application, drag chains formed by pivotally connectable links have been provided to move in an arcuate configuration and around corners in a predetermined path. These links have relied on a dragging action to move abrasive solid materials. Such drag chains are typically endless belts formed by interconnecting metal links which are specially constructed to withstand the severe conditions encountered.

A need exists, however, for a flexible belt conveyor which can be driven in a manner of a drag chain or in combination with chain links so as to carry solid materials around corners avoiding the use of the edge guiding rollers of the prior art.

DESCRIPTION OF THE PRIOR ART

The only known prior art is directed individually to drag chain links and belt drive conveyors. None are known directed to the marriage of drag chain links with a belt type conveyor.

U.S. Pat. No. 3,331,484 discloses an abrasion resistant drag-type feed chain which employs similar chain links. However, the center line of these links is so close to or aligned with the center of the slots in the interconnecting links that the body of the abrasion material of the dragging portion of the chain link adjacent the slots ruptures frequently in use thereby requiring shut down and repair of the drag chain.

U.S. Pat. Nos. 3,160,024 and 573,988 disclose link members wherein the interconnecting slots and associated pins of adjacent links are positioned along the center lines of the interconnected links forming the conveyor.

U.S. Pat. No. 4,187,943 discloses drag type feed chains employing links interconnecting one with the other at positions sufficiently above the center lines of the links to increase the strength of the associated abrasion dragging surfaces of the links.

Accordingly, chain driven flexible conveyor belts especially adapted to move easily around arcuate curves for feeding abrasive material to various pieces of processing equipment are needed.

SUMMARY OF THE INVENTION

In accordance with the invention claimed, improved chain driven conveyor belts are disclosed which move easily around the arcuate paths.

It is, therefore, one object of this invention to provide a new and improved conveyor belt.

Another object of this invention is to provide a new and improved chain driven flat top flexible belt type conveyor.

A further object of this invention is to provide a new and improved conveyor belt that is guided axially along its longitudinal axis.

A still further object of this invention is to provide a new and improved belt type conveyor that can move along an arcuate path avoiding any edge guiding means.

A still further object of this invention is to provide a new and improved conveyor belt comprising a chain linkage supporting over it a flat flexible elongated web forming the carrying surface of the conveyor.

These and other further and more specific objects and advantages of the present invention will be apparent from the following detailed description thereof and the accompanying drawings.

BRIEF DESCRIPTION OF THE DRAWING

The present invention may be more readily described by reference to the accompanying drawing in which:

FIG. 1 is a diagrammatic plan view of a belt type conveyor of the prior art illustrating the edge mounted guiding rollers for aiding the belt in moving along an arcuate path;

FIG. 2 is a cross-sectional view of FIG. 1 wherein a chain is used to pull the flat webbing of the conveyor belt but the belt is supported by rollers and guided by edge mounted rollers;

FIG. 3 is a cross-sectional view of a flat belt type conveyor employing a chain drive guided in a trough and embodying the invention;

FIG. 4 is a perspective exploded view of a pair of links permitting sideward pivotal movement between interconnecting links one of which is provided with means for fastening to and supporting an elongated conveyor belt;

FIG. 5 is a top view of the interconnection of two pairs of the links shown in FIG. 4;

DESCRIPTION OF THE PREFERRED EMBODIMENT

Figure 6:
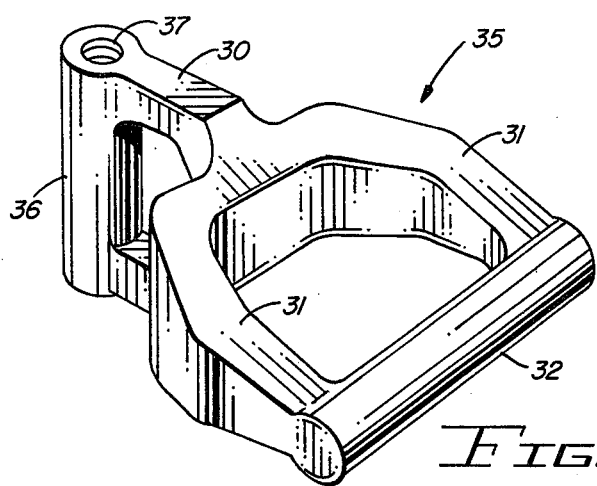
FIG. 6 is a perspective view of a modification of one of the links shown in FIGS. 4 and 5.

Referring more particularly to the drawing by characters of reference, FIG. 1 representing the prior art discloses a conveyor belt 15 guided along an arcuate path by a plurality of edge engaging rollers 16. FIG. 2 represents a means of driving the belt 15 shown in FIG. 1 by means of a chain drive 17 bolted thereto along its longitudinal axis. Support rollers 18 and 19 may be spacedly arranged along its longitudinal axis as well as on each side of its center line.

As shown in FIG. 3, belt 15 may be guided along its path and around arcuate portions thereof by a U-shaped channel 20 thereby eliminating any need for the edge engaging guiding rollers 16 shown in FIGS. 1 and 2. This channel may extend around only the arcuate portion of the conveyor path or along its total length.

In accordance with one embodiment of the present invention, a drag chain is provided utilizing a plurality of links, each link being formed of a single casting and adapted to be connected to other links without the expediency of a pin and/or pin retainer structure. The material pushing surface of the known drag chain links extending substantially perpendicular to the supporting surface may be eliminated since the links are secured to a flat flexible belt which carries the abrasive particles or other type of load.

FIGS. 4 and 5 disclose a plurality of links wherein a link 21 is pivotally connectable with a link 22 so as to permit the chain formed by such links to move in an arcuate configuration and around corners along a predetermined path.

As shown, link 21 comprises a bar journal 23 formed by two arcuate spaced portions 24 in cooperation with a portion 25. The journal opens upwardly, outwardly and away from the dragging surface 26 of link 21. A flange 27 forming a part of portion 25 is arranged to extend laterally from portion 25 and parallel with its dragging surface 26 and is provided with a slot or journal 28 for engaging with a connecting bar or pin 29 of link 22. Extending outwardly of the longitudinal axis of bar 29 is an arm 30 which extends outwardly therefrom in a U-shaped configuration to form support arms 31 for a connecting bar 32 extending between its spaced apart ends 33.

This link then is free to rotate about two axes mutually perpendicular to each other.

As shown in FIG. 4 the connecting bar or pin 29 extends above the top surface of arm 30 of link 22 a sufficient distance such that it may extend through a flexible conveyor belt 34 in the manner shown in FIG. 7 for another link hereinafter described. Pin 29 is threadedly secured thereto by a bolt and suitable washer arrangement in the manner illustrated in FIG. 7.

Figure 8:
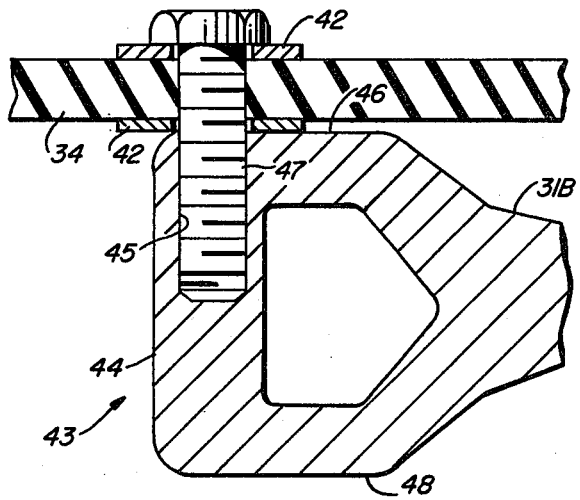
FIG. 8 is a front view partially in cross-section of a modification of the link and belt arrangement shown in FIG. 7.

FIG. 6 illustrates a modification of the link 22 shown in FIGS. 4 and 5 wherein link 35 differs from link 22 in that its pin 36 is provided with a threaded opening 37 in its upper end for receiving a bolt for attaching it to a belt 34 in the manner shown in FIG. 8. All other parts of link 35 are provided with the same reference characters as similar parts of link 22.

Figure 7:
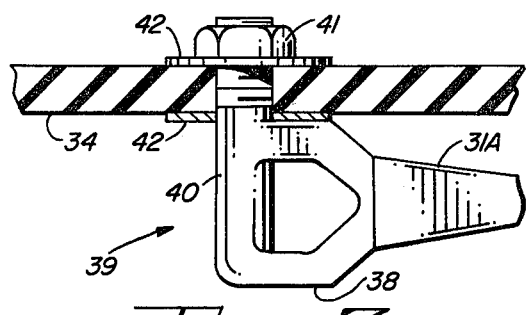
FIG. 7 is a front view partially in cross-section of a modification of the link shown in FIG. 6 threadedly connected to an elongated conveyor belt.

FIG. 7 discloses a further modification of the links shown in FIGS. 4, 5 and 6 wherein the siding surface 38 of link 39 is positioned at the base of pin 40 forming the belt attachment portion of the link. The arms 31A of the link do not form dragging surfaces in the manner that arms 31 do in FIGS. 4-6. The upper periphery of pin 40 is threaded for extending through an aperture in belt 34 for attachment thereto by nut 41 and washers 42 in the manner shown.

FIG. 8 discloses a modification of the link 39 shown in FIG. 7 wherein link 43 is similar to link 35 of FIG. 6 in that its pin 44 is provided with a threaded opening 45 extending axially into it from its top surface 46 for receiving a bolt 47 in threaded arrangement therewith. Link 43 is provided with a drag surface 48 for engaging the supporting surface (not shown) with its arms 31B extending laterally from and above the supporting surface in the manner shown for link 39 of FIG. 7.

Figure 9:
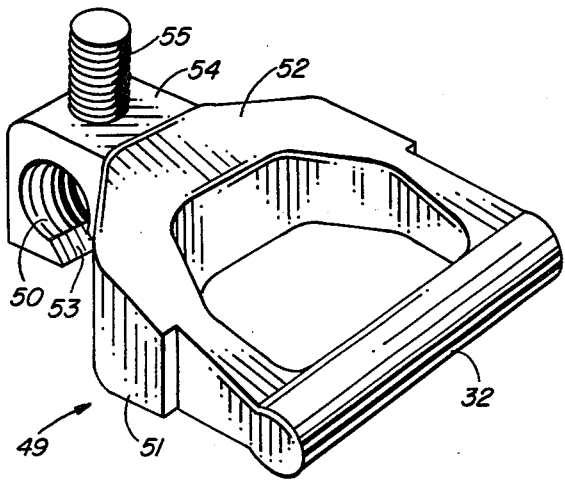
FIG. 9 is a perspective view of a still further modification of the links shown in FIGS. 4-8.
Figure 10:
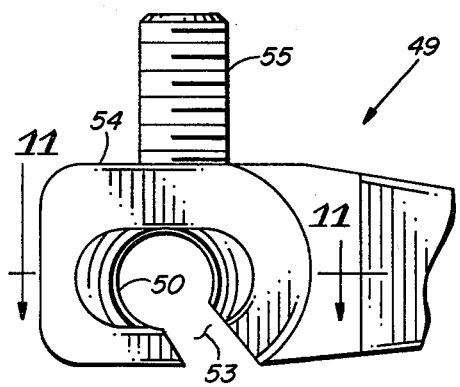
FIG. 10 is a partial side view of FIG. 9 showing the curved throat of the link engaging slot.
Figure 11:
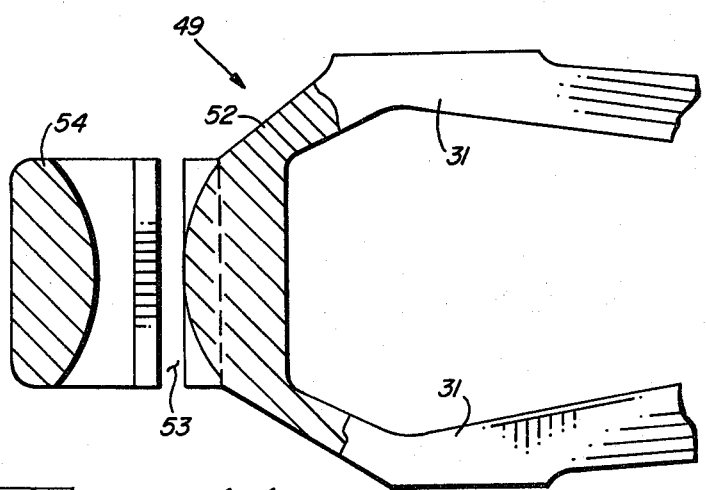
FIG. 11 is a cross-sectional view of FIG. 10 taken along the line 11—11.

FIGS. 9–11 disclose a further modification of the links shown in FIGS. 1–8, wherein line 49 is provided with similar component parts as links 22 and 35 and given the same reference characters for said similar parts but differing in that the pin of links 22 and 35 has been replaced with a connecting bar journal 50 having an axis substantially parallel to the dragging surface 51 of the U-shaped channel 52. A slot 53 extends from the bar journal 50 outwardly of the connecting member 54 of which it comprises a part and is tapered inwardly as it approaches the journal 50 to provide a means for guiding the connecting bar 32 into the journal.

As noted from FIGS. 10 and 11 of the drawing, slot 53 is straight but the throat of the bar journal 50 is curved so that it has lateral action when a bar 32 of a connecting link is positioned therein. As shown in FIGS. 9 and 10, a threaded stud or bolt 55 extends upwardly of the top surface of the connecting member 54 for attachment to a conveyor belt 34 in the manner shown in FIGS. 7 and 8.

Although but a few embodiments of the present invention have been illustrated and described, it will be apparent to those skilled in the art that various changes and modifications may be made therein without departing from the spirit of the invention or from the scope of the appended claims.

What is claimed is:
1. A link for a drag chain comprising:
a supporting surface,
support arms extending rearwardly from said supporting surface,
a connecting bar formed integral with the free ends of said support arms, and
an attachment pin extending laterally from said supporting surface substantially perpendicular to said connecting bar, and
means comprising a part of said pin for use in attaching the link to the surface of a flat belt conveyor.
2. The link set forth in claim 1 wherein:
said means comprises a threaded free end of said attachment pin which is arranged to extend through the associated conveyor belt for threadedly engaging a nut.
3. The link set forth in claim 1 wherein:
said means comprises a hollow configuration formed in the free end of said pin which is provided with internal threads.
4. The link set forth in claim 1 in further combination with:
a connecting member mounted adjacent one edge of said supporting surface,
a connecting bar journal formed in said connecting member and extending substantially parallel to said supporting surface, and
a journal slot opening outwardly of said journal for receiving and guiding a connecting bar of an associated link into said journal.
5. A chain driven conveyor comprising:
a plurality of interconnected links,
each of said links comprising a supporting surface,
support arms extending rearwardly from said supporting surface,
a connecting bar formed integral with the free ends of said support arms,
a connecting member mounted adjacent one edge of said supporting surface, a connecting bar journal formed in said connecting member and extending substantially parallel to said supporting surface, a journal slot opening outwardly of said journal for receiving and guiding a connecting bar of an associated link into said journal, an attachment pin extending laterally from said supporting surface for attachment to the surface of a flat belt conveyor, and a flat belt conveyor extending longitudinally of said linkage for attachment to each pin of said linkage.

6. The chain driven conveyor set forth in claim 5 wherein:

said pin of each of the links extends substantially perpendicular to said connecting bar.

7. The chain driven conveyor set forth in claim 5 wherein:

the free end of said pin is threaded for extending through an aperture in said belt for threaded engagement with a nut.

8. The chain driven conveyor set forth in claim 5 wherein:

the free end of said pin is hollow and provided with internal threads.

9. The chain driven conveyor set forth in claim 5 wherein:

said conveyor comprises a flexible belt.

10. A chain driven conveyor comprising:

a first link, said first link defining a supporting surface, means comprising support arms extending rearwardly from said supporting surface, a connecting bar formed integral with the free ends of said support arms, an attachment pin extending laterally from said supporting surface substantially perpendicular to said connecting bar for attachment to the surface of a flat belt conveyor, a second link, said second link comprising a bar journal extending substantially perpendicular to its longitudinal axis, a journal slot opening outwardly of said journal for receiving and guiding said connecting bar of said first link into said journal, said second link comprising a flange defining a second journal slot having an axis extending substantially perpendicular to its longitudinal axis, at least a part of said pin of said first link being journaled in said second journal slot for providing a pivotal connection for said second link relative to said first link, and a flat belt conveyor extending longitudinally of the interconnected first and second links for attachment to said pin of said first link.

11. The chain driven conveyor set forth in claim 10 in further combination with:

a plurality of pairs of said first and second links connected in sequence configuration, and said pin of each of the first links of the sequence being attached to said belt.

12. The chain driven conveyor set forth in claim 11 wherein:

said belt is flexible.

* * * * *